April 11, 1961  S. M. DOVER  2,978,958
REFLECTOR MOUNTING ELEMENT
Filed Oct. 8, 1956
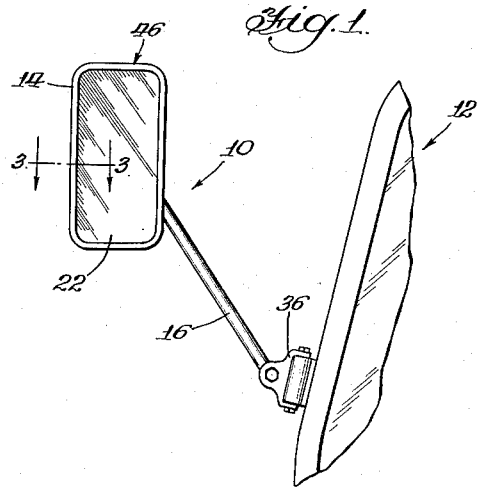
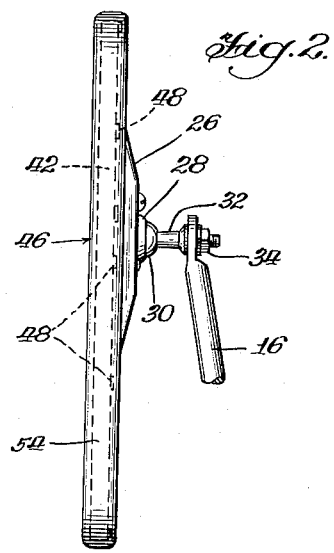
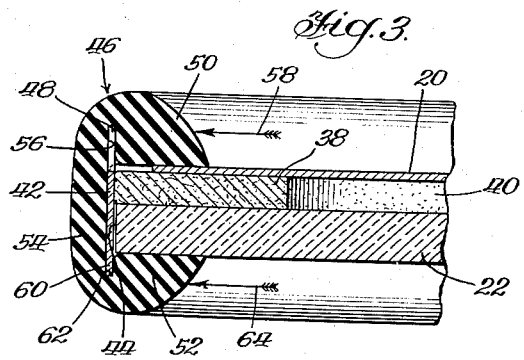
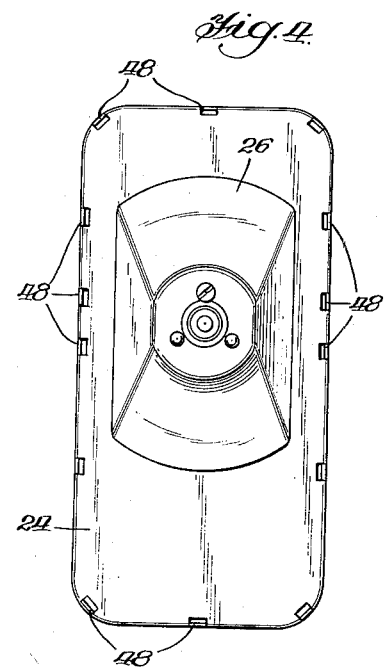
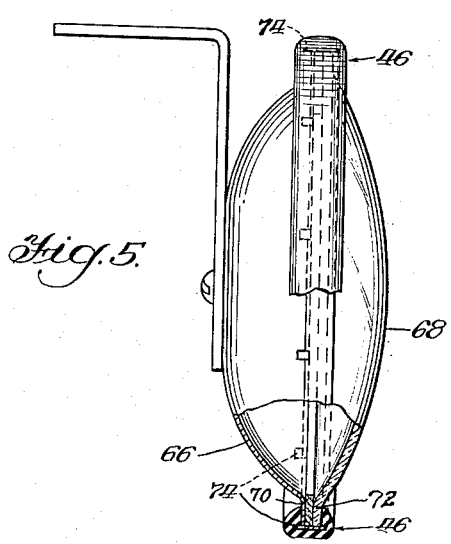
INVENTOR.
Samuel M. Dover
BY Morris Spector
Atty.

United States Patent Office 2,978,958
Patented Apr. 11, 1961

2,978,958

REFLECTOR MOUNTING ELEMENT

Samuel M. Dover, 1462 S. Michigan Ave., Chicago, Ill.

Filed Oct. 8, 1956, Ser. No. 614,480

3 Claims. (Cl. 88—96)

The present invention relates to a guard element for such devices as mirrors, reflectors, lamps, etc., and more particularly such devices utilized in connection with automobiles or trucks.

The invention has particular adaptation to rear view mirrors, although it is not limited thereto, and is also applicable to other kinds of reflectors and to lamps. The device is in the nature of a holding or guard rim surrounding the periphery of the article, such as a mirror or lens, and holds the lens and minimizes damage thereto. The rim is made of rubber or rubber-like material, such as the various plastics, for instance polyethylene, and is detachably applied to the marginal edge of the device and thereby holds it in place.

It is an object of this invention to provide a novel construction in a mirror head or the like in conjunction with a rim which is mounted in such a way as to resist forces tending to dislodge or displace it.

Other objects and advantages of the invention will appear from the following detail description taken in conjunction with the accompanying drawings in which:

Figure 1 is an elevational view of a mirror equipped with the guard rim of the present invention, showing its mounting on a vehicle such as a truck;

Figure 2 is a side elevational view of the mirror head of Figure 1, taken from the left of that figure;

Figure 3 is a large scale sectional view taken on the line 3—3 of Figure 1;

Figure 4 is an elevational view of the rear surface of the mirror head, with the guard rim removed; and Figure 5 is a side elevational view of a lamp equipped with a guard rim made according to the present invention, with the latter shown in section.

Attention is directed to the details of construction of the devices of the drawings and particularly to Figure 1 which includes a mirror, indicated generally at 10, mounted on a vehicle 12 which as represented in the drawing may be a truck. The mirror includes a mirror head 14 and an extension arm 16 by means of which the mirror head is mounted. The mirror, as will be observed from the drawing, is a rear view mirror and as here illustrated is mounted on the exterior of the truck. However, the concept of the invention is such as to include a rear view mirror mounted in other places, such as within the vehicle.

The mirror head 14 includes a backing element 20 and a reflector element 22. The backing element 20 may be of suitable material such as a metal stamping and defines the outline size and shape of the mirror head, while the reflector element 22 is of outline size and shape generally similar to the backing element 20. The backing element 20 includes a main portion 24 (Fig. 4). Within the outline of the backing element 24 is a portion 26 which serves as a mounting portion and may be embossed from the main surface 24 and in which is formed a socket 28 for receiving a ball 30 forming a conventional ball and socket connection, of well-known construction, for universal swinging movement of the mirror head. The ball 30 is formed on or secured to the end of a stud or bolt 32 which may be mounted in a suitable manner such as by extension through an aperture in the outer end of the extension arm 16 and securement therein by a nut threaded on the end of the bolt. The extension arm 16 is mounted on the truck or vehicle 12 in any desired manner such as by means of a hinge element 36 having a suitable mounting connection with the arm 16. The stem or belt 32 thus supports the mirror head 14, on the arm 16, for universal swinging movement.

The reflector element 22, which in this instance is a mirror of glass, plastic or the like, is mounted on the backing element with a certain degree of resiliency so as to reduce the likelihood of breaking of the reflector element in the event it is struck by missiles, stones, etc. In the present instance a perimeter gasket strip or band of felt 38 is interposed between the reflector element and the backing element. This band is of relatively minor width relative to the mirror head itself so that a space, indicated at 40, is provided between the reflector element and the backing element throughout the greater portion of the back area of the reflector element.

The backing element 20 is provided with a surrounding flange or rim 42 extending around the periphery thereof which encompasses, with a minimum clearance 44, the marginal edge of the reflector element 22 and projects forwardly thereof as indicated at 60 around the entire periphery thereof.

A holding band or guard is indicated in its entirety at 46 and is in the form of a continuous strip or endless band of the same cross section throughout its perimeter and extending entirely around the periphery of the reflector 22 and backing element 20. The rim is generally channel-shaped in cross section as clearly illustrated in Figure 3, and receives the marginal portion or edge of the assembled reflector element and backing element therein, with a portion that grips the front surface of the reflector element and rear surface of the backing element along the entire perimeters of each thereof.

In order to retain the band 46 in place, projections are provided on the backing element for forming an interlock with the band. These projections are indicated at 48 and are formed preferably as integral portions or elements of the backing element 20. They may be formed by a suitable well-known operation of stamping and are disposed substantially flush with the outer marginal edge surface of the surrounding wall element 42, as shown most clearly in Figures 3 and 4. These projections 48 are spaced along the periphery of the backing element at suitable locations, as shown in Figure 4, for interlocking engagement with the band 46 at well distributed locations for effective retention of the rim on the mirror head.

The band 46 includes identical flanges 50 and 52 extending the full length of the band, and an outer continuous web 54 interconnecting the flanges. The flanges overhang the inner face of the web, leaving identical aligned grooves 56 and 62 between the inner face of the web and the overhanging flanges 50 and 52, which grooves extend the full length of the endless band constituting the rim. The band is tensioned around the assembled reflector element 22 and backing element 20 with the marginal portions of the latter received between the flanges 50 and 52 while the surrounding wall portion 42 engages the web element 54. In the normal untensioned position of the band the inner edges of the inner surfaces of the flanges 50 and 52 are closer to the web than illustrated, those flanges being spread apart by the backing element 20 and the mirror 22 to the position illustrated in Figure 3, in which position the grooves 56 and 62 have been stretched or expanded to the widths shown in Figure 3. In this position the inner face of the flange 50 is in pressure sealing engagement with the rear of the backing element 20 and the inner face of the flange 52 is in pressure sealing relationship with the front of the mirror 22 along the entire perimeter of the backing member 20 and of the front face of the mirror 22, respectively. The flanges are biased into pressure engagement with the rear surface of the backing element 20 by the resiliency of the tensioned band constituting the rim 46. Thus an interlocking effect is produced between the rim and the assembled elements 22 and 20 of the mirror head which effectively resists displacement of the rim or guard from the mirror head by any forces, including those directed laterally outwardly against the portion 50 such as in the direction of the arrow 58.

The rim or guard is of such dimensions and proportions in cross section as to also resist deflection of the flange portion 50 in a "peeling" operation such as would lift the flange portion 50 from the surface of the backing element 20 and snapping it off of the projections 48. The inner surface of the rim or guard is defined by relatively short radii, and the wall thickness of the rim is relatively great so that any tendency to snap the rim off of the edge of the mirror head is greatly resisted.

A similar interlocking effect is provided on the front surface of the mirror head by a relatively simple construction in which the front edge 60 of the peripheral flange or wall element 42 is received within the groove 62.

The normal elasticity of the rubber or rubber-like material making up the rim 46 enables the rim to be applied to the mirror head with facility, the material yielding sufficiently to permit stretching of it within its elastic limits to snap it over and around the edge of the reflector 24 and backing element 20. If for any reason it is desired to remove the rim 46, it may be so removed by lifting either of the flange portions 50 or 52 and snapping the rim off of the corresponding projections 48 and 60.

From the above description it is apparent that the band 46 holds the mirror 22 assembled within the frame or backing element 20 and maintains a substantially watertight seal around the perimeter of the front face of the mirror 22 and around the perimeter of the rear face of the backing 20. The band 46 is resiliently and releasably held against removal from the mirror by reason of the interlocking of the front rim 62 within the groove of the band and the interlocking of the projections 48 within the grooves 56 of the band. Yet by the exertion of the necessary amount of force, within the elastic limits of the band, the band may be removed from the rest of the mirror head.

Although the foregoing illustrations and descriptions have to do with a mirror, the rim or guard, as mentioned above, has adaptability to other articles, such as lamps, reflectors, etc. In this connection reference is made to Figure 5 which illustrates the rim applied to a lamp. Such a lamp is of generally standard construction and includes a body or bowl-like structure 66 and a lens 68. The body 66 has a peripheral radial flange terminating in a rim 70 surrounding the front open side and extending forward axially. The lens 68 is provided with a rim or flange 72 that fits snugly on the rim 70.

The rim 70 has a plurality of rearward projections 74 similar to the projections 48, extending rearwardly at right angles from the rim 70 at the periphery thereof. These projections are integral with and spaced around the rim 70 and spaced peripherally around the lamp. The rim 46 is fitted to the marginal edge of the lamp as illustrated in Figure 5 and as described in connection with Figure 3.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A mirror head or like article comprising a backing which is a metal stamping having forwardly extending projection means and rearwardly extending projection means at its periphery, one of said projection means comprising tongues defined by cuts in the backing with all of the cuts terminating along a line of bend adjacent to the periphery of the backing and with the tongues separated from the rest of the backing at the lines of cut and projecting in one direction from the backing, the material of the backing between adjacent tongues extending from the rest of the backing in a direction opposite to the tongues along said line of bend and constituting the other of said projection means, a reflector overlying the front of the backing, one of said projection means surrounding said reflector and extending forwardly thereof, and a continuous rubber-like band surrounding the perimeter of the backing and reflector and enclosing both of the projection means and grippingly engaging the front and rear surfaces of the reflector and the backing, respectively, at positions laterally inwardly of the projection means, said band being symmetrical forward and rearwardly thereof on opposite sides of a longitudinal center line therethrough so that either side of the band may be positioned at the front or rear surfaces at will.

2. A mirror head or like article comprising a back element comprising a sheet of workable material such as metal having integral projections spaced along its margin and extending rearwardly from a rear surface and having a forwardly extending peripheral wall element integral with and extending at a substantial angle to the rest of the sheet, said projections comprising tongues defined by lines of cut in said sheet and separated from the rest of the sheet at said lines of cut to extend in a direction opposite that of said peripheral wall, a reflector element assembled over the front surface of the backing element within said wall element and of outline size and shape generally similar to that defined by the wall element, said wall element surrounding said reflector and extending forwardly thereof, and a rubber-like band surrounding the periphery of the assembly and having inwardly extending front and rear flanges opposite one another and forming an interior space receiving the marginal portions of the assembly with the rear and front flanges gripping the rear and front surfaces, respectively, of the backing element and reflector element, and the rear flange so engaging the rear surface inwardly of the projections and enclosing the latter within its interior space.

3. A mirror head or like article comprising a backing element and a light directing element secured to a front surface thereof, said backing element having rearwardly extending projection means at its periphery and forward extending projection means at its periphery surrounding the light-directing element and extending forwardly thereof, one of said projection means comprising tongues defined by cuts in the backing with all of the cuts terminating along a line of bend adjacent to the periphery of the backing and with the tongues separated from the rest of the backing at the lines of cut and projecting in one direction from the backing, the material of the backing between adjacent tongues extending from the rest of the backing in a direction opposite to the tongues along said line of bend and constituting the other of said projection means and a continuous rubber-like band surrounding the backing and reflector and enclosing the projection means, said band also grippingly engaging the front and rear surfaces of the lifht-reflecting element and backing, respectively, at positions laterally inwardly of the projection means.

References Cited in the file of this patent

UNITED STATES PATENTS

| | | |
|---|---|---|
| 752,958 | Conroy | Feb. 23, 1904 |
| 1,392,481 | Colbert et al. | Oct. 4, 1921 |
| 2,111,641 | Ritz-Woller | Mar. 22, 1938 |
| 2,495,347 | Ritz-Woller | Jan. 24, 1950 |
| 2,729,142 | Beach | Jan. 3, 1956 |